US009805559B2

(12) United States Patent
Kim

(10) Patent No.: US 9,805,559 B2
(45) Date of Patent: Oct. 31, 2017

(54) AUTOMATED TELLER MACHINE

(71) Applicant: NAUTILUS HYOSUNG INC., Seoul (KR)

(72) Inventor: Youn Jong Kim, Gyeonggi-do (KR)

(73) Assignee: NAUTILUS HYOSUNG INC., Seoul (KR)

( * ) Notice: Subject to any disclaimer, the term of this patent is extended or adjusted under 35 U.S.C. 154(b) by 0 days.

(21) Appl. No.: 15/381,197

(22) Filed: Dec. 16, 2016

(65) Prior Publication Data

US 2017/0278359 A1 Sep. 28, 2017

(30) Foreign Application Priority Data

Mar. 23, 2016 (KR) ........................ 10-2016-0034842

(51) Int. Cl.
*G06Q 40/00* (2012.01)
*G07F 19/00* (2006.01)

(52) U.S. Cl.
CPC .................................. *G07F 19/205* (2013.01)

(58) Field of Classification Search
CPC .. G07D 11/00; G07D 11/0081; G07F 19/2055
USPC ............................................... 235/379; 902/8
See application file for complete search history.

(56) References Cited

U.S. PATENT DOCUMENTS 8,833,538 B2 * 9/2014 Oh .......................... G07F 19/20 194/350
8,887,996 B2 * 11/2014 Allan .................. G07F 19/2055 109/19
2014/0209518 A1 * 7/2014 Mishra .............. G07D 11/0003 209/534

* cited by examiner

*Primary Examiner* — Seung Lee
(74) *Attorney, Agent, or Firm* — Bacon & Thomas, PLLC

(57) ABSTRACT

Embodiments of the present disclosure provides an automated teller machine comprising: a main frame; a display unit provided in the main frame; a front panel rotatably installed at the main frame; a mounting unit connecting the front panel rotatably to the main frame; a guide unit configured to guide frontward/backward movement of the display unit; and a link unit, rotatably connected to the mounting unit, configured to return the display unit that has been moved frontward to an original position when the front panel starts to be closed.

7 Claims, 11 Drawing Sheets

AUTOMATED TELLER MACHINE

TECHNICAL FIELD

The present disclosure relates to an automated teller machine.

BACKGROUND

In general, an automated teller machine is a device capable of providing financial services such as deposit and withdrawal without help of a bank staff and regardless of time and place.

The automated teller machine can be classified into a withdrawal machine and a deposit machine depending on whether it is used for withdrawal or deposit. Recently, the automated teller machine is used for various purposes such as deposit/withdrawal of cash and check, bankbook updating, electronic bill payment, ticket selling and the like.

The automated teller machine has therein modules having various functions. The respective modules are organically driven with one another. Therefore, when the automated teller machine is used for a long period of time, the modules may have breakdown or failure.

To that end, the automated teller machine needs to be examined regularly. Further, the automated teller machine having breakdown or failure needs to be quickly repaired. Although the maintenance operation of the automated teller machine may be different depending on model types, it is generally performed by opening a front panel. A bank staff may perform a software-side maintenance operation by using a maintenance display unit provided inside the automated teller machine. In order to perform the maintenance operation, the bank staff opens the front panel and moves the display unit frontward from the original position.

After the maintenance operation is performed by opening the front panel and moving the display unit frontward, the bank staff should return the display unit to the original position and close the front panel.

However, if the bank staff closes the front panel without returning the display unit to the original position after the maintenance operation, the front panel collides with the display unit, which may result in breakdown or damage of the front panel and the display unit.

Patent Document: Korean Registered Patent No. 10-1253450 (registered on Apr. 4, 2013)

SUMMARY

Embodiments of the present disclosure provide an automated teller machine in which damage of the front panel and a display unit is prevented because the display unit automatically returns to an original position when a bank staff closes the front panel.

TECHNICAL SOLUTION

In view of the foregoing problems, the present disclosure provides an automated teller machine comprising: a main frame; a display unit provided in the main frame; a front panel rotatably installed at the main frame; a mounting unit connecting the front panel rotatably to the main frame; a guide unit guiding front and backward movement of the display unit; and a link unit, rotatably connected to the mounting unit, configured to return the display unit that has been moved frontward to an original position when the front panel starts to be closed.

Further, the present disclosure also provides the automated teller machine wherein the guide unit includes: a horizontal slit configured to guide the display unit to move in a horizontal direction; and an inclined slit, extending from the horizontal slit and inclined downward.

Further, the present disclosure also provides the automated teller machine wherein the display unit includes: one or more guide protrusions projecting at one side or both sides the display unit, wherein said one or more guide protrusions are inserted into the horizontal slit and the inclined slit and moved along the horizontal slit and the inclined slit.

Further, the present disclosure also provides the automated teller machine further comprising: an elastic member, having one end connected to the display unit and the other end connected to the guide unit, wherein when the display unit is moved frontward from the guide unit, an elastic force of the elastic member acts on the display unit.

Further, the present disclosure also provides the automated teller machine wherein the link unit includes: a first link member having one end connected to the mounting unit via a first hinge; a second link member having one end including a pin member inserted into a long hole formed at the first link member; and a retracting member coupled to the other end of the second link member.

Further, the present disclosure also provides the automated teller machine wherein the display unit has a retracting support member that becomes in contact with the retracting member when the front panel is closed, and wherein when the retracting member rotates in a state where the display unit is moved frontward from the guide unit and reaches a frontmost position, the retracting member and the retracting support member are brought into contact with each other and the display unit is moved backward toward the guide unit by a rotation force.

Further, the present disclosure also provides the automated teller machine further comprising: a first damper, provided at an upper sidewall of the main frame, rotatably connected to the mounting unit, configured to reduce impact that may be generated when the front panel is opened or closed; and a second damper, provided at a lower sidewall of the main frame, configured to reduce impact that may be generated when the front panel is closed.

The present disclosure provides the automated teller machine in which the damage of the front panel and the display unit is prevented because the display unit automatically returns to the original position when a bank staff closes the front panel.

BRIEF DESCRIPTION OF THE DRAWINGS

The objects and features of the present disclosure will become apparent from the following description of embodiments, given in conjunction with the accompanying drawings, in which.

DETAILED DESCRIPTION OF THE EMBODIMENTS

Figure 1:
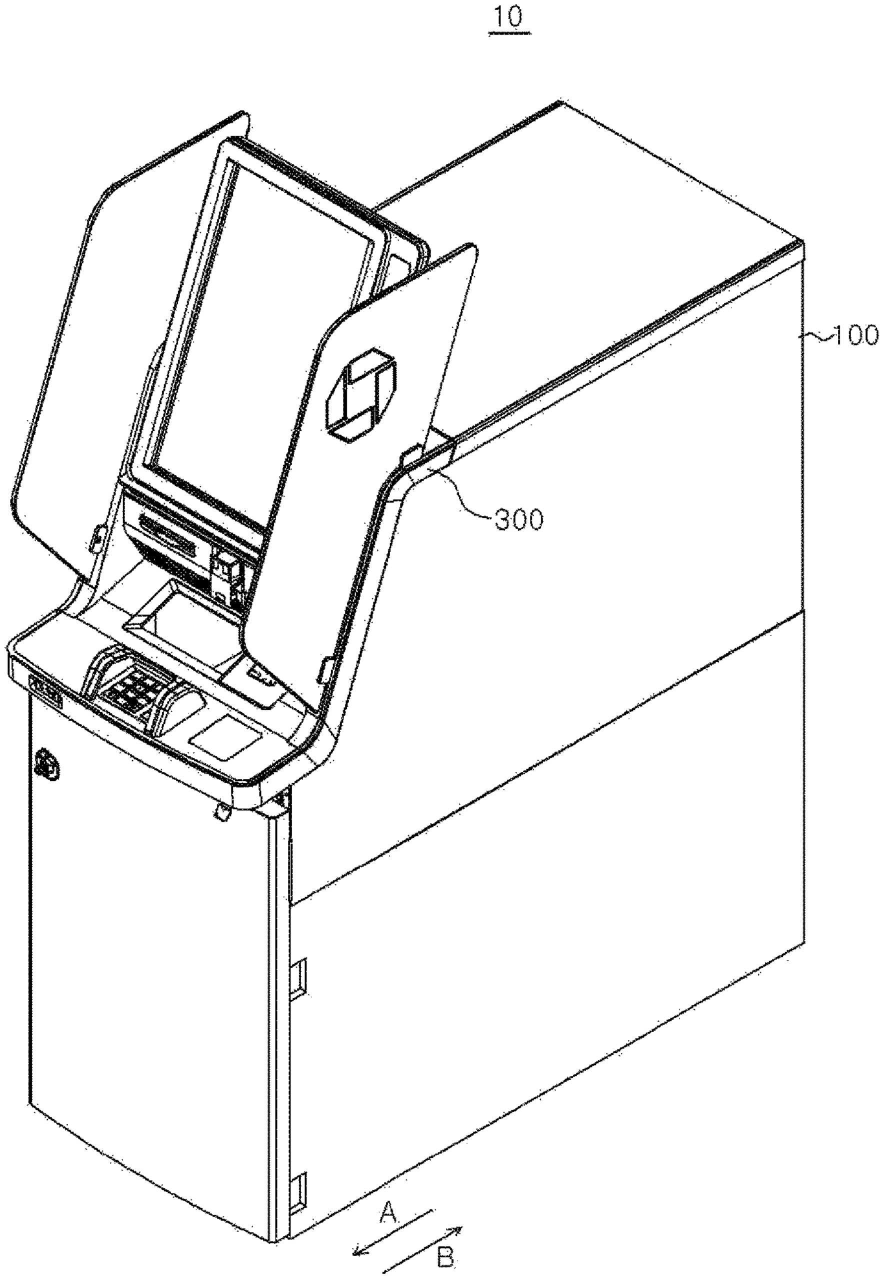
FIG. 1 shows an automated teller machine according to an embodiment.

Hereinafter, configurations and operations of embodiments will be described in detail with reference to the accompanying drawings. The following description is one of various patentable aspects of the present disclosure and may form a part of the detailed description of the present disclosure.

However, in describing the present disclosure, detailed descriptions of known configurations or functions that make the present disclosure obscure may be omitted.

The present disclosure may be variously modified and may include various embodiments. Specific embodiments will be exemplarily illustrated in the drawings and described in the detailed description of the embodiments. However, it should be understood that they are not intended to limit the present disclosure to specific embodiments but rather to cover all modifications, similarities, and alternatives which are included in the spirit and scope of the present disclosure.

The terms used herein, including ordinal numbers such as "first" and "second" may be used to describe, and not to limit, various components. The terms simply distinguish the components from one another.

When it is said that a component is "connected" or "linked" to another component, it should be understood that the former component may be directly connected or linked to the latter component or a third component may be interposed between the two components.

Specific terms used in the present application are used simply to describe specific embodiments without limiting the present disclosure. An expression used in the singular encompasses the expression of the plural, unless it has a clearly different meaning in the context.

Figure 2:
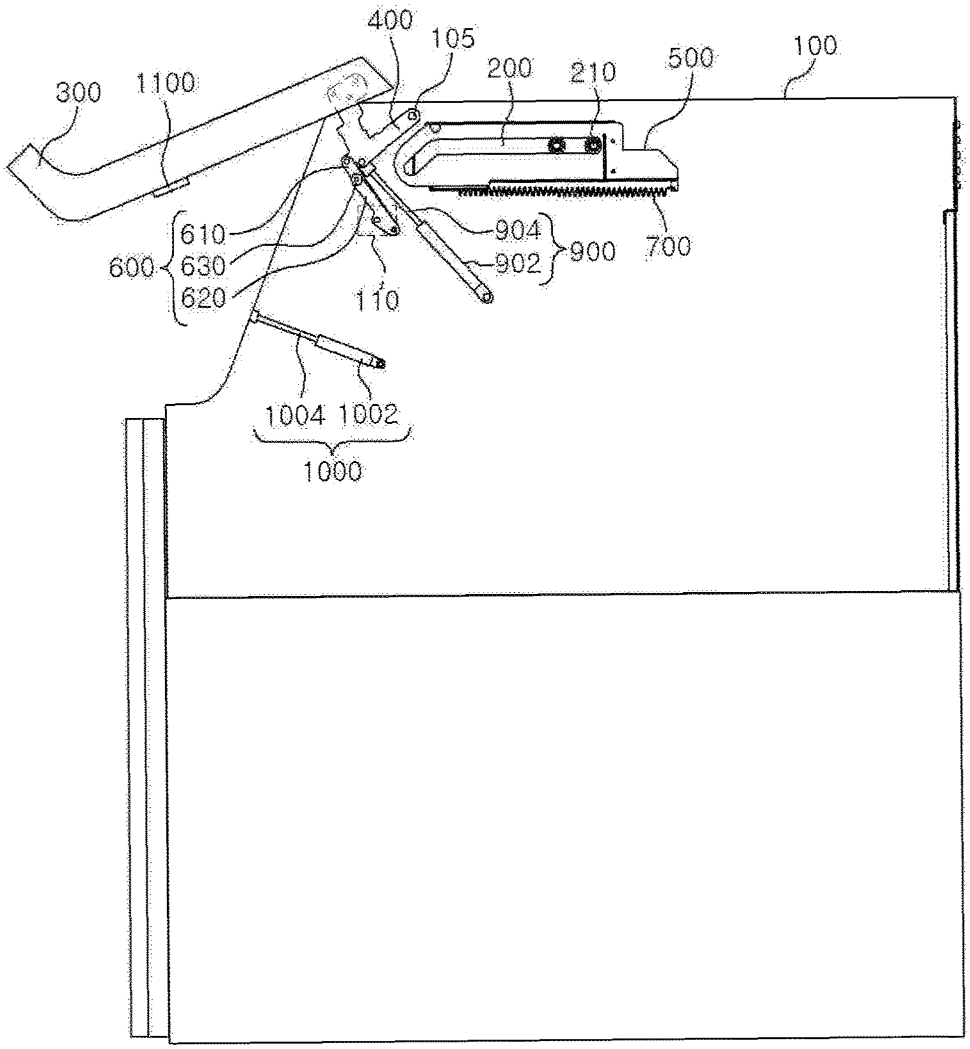
FIG. 2 is a side view showing a state in which a front panel of the automated teller machine shown in FIG. 1 is opened.
Figure 3:
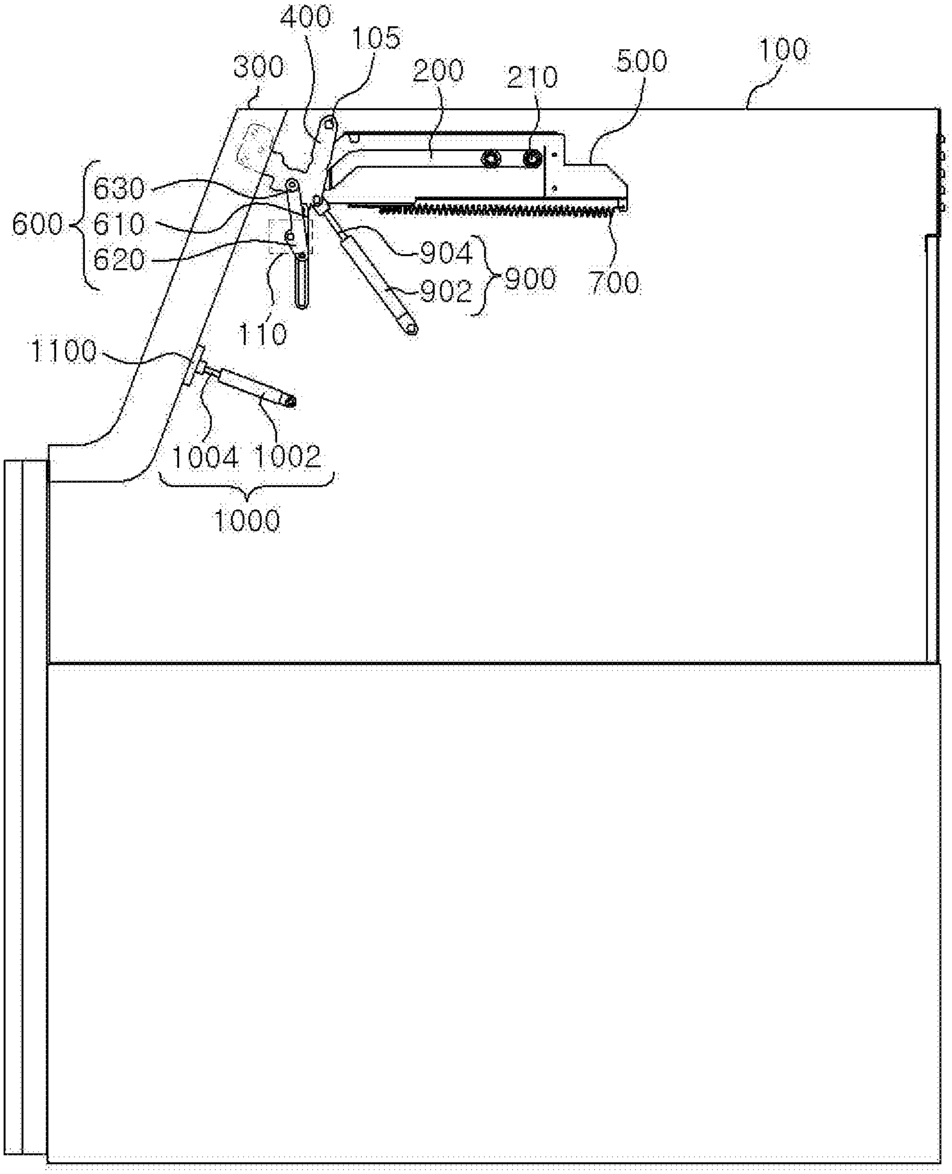
FIG. 3 is a side view showing a state in which the front panel of the automated teller machine shown in FIG. 1 is closed.
Figure 4:
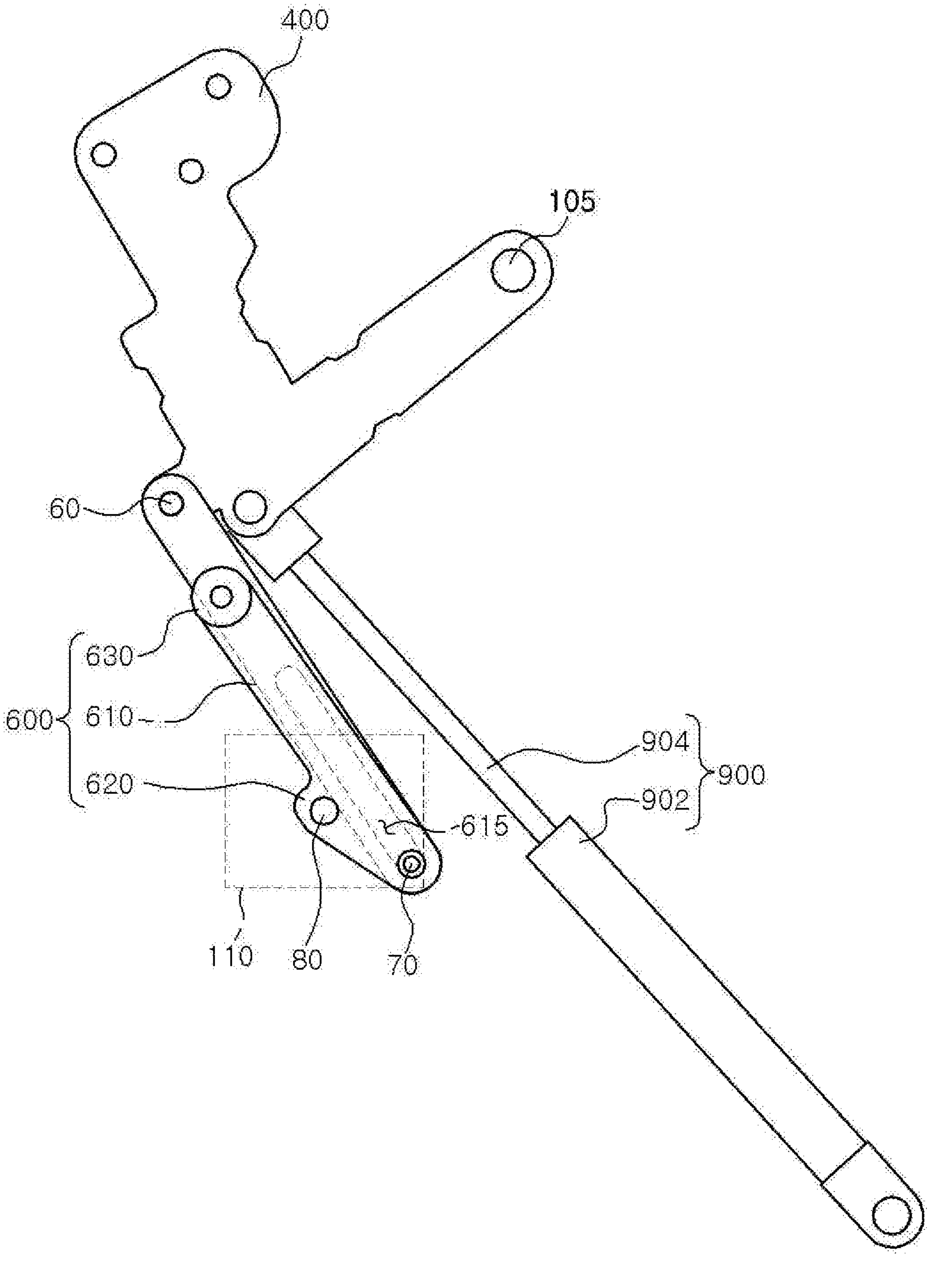
FIG. 4 shows details of a first damper and a link unit in a state where the front panel of the automated teller machine shown in FIG. 1 is opened.
Figure 5:
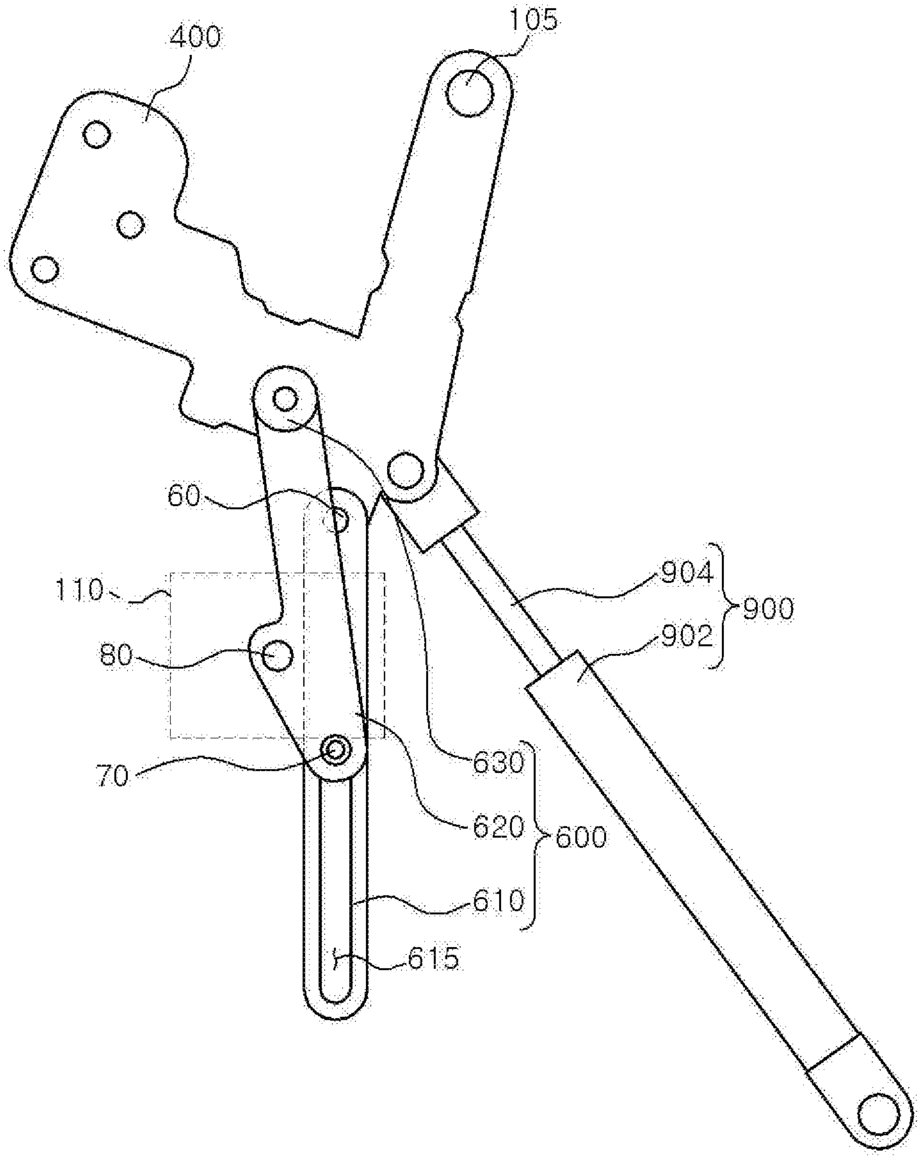
FIG. 5 shows details of the first damper and the link unit in a state where the front panel of the automated teller machine shown in FIG. 1 is closed.
Figure 6:
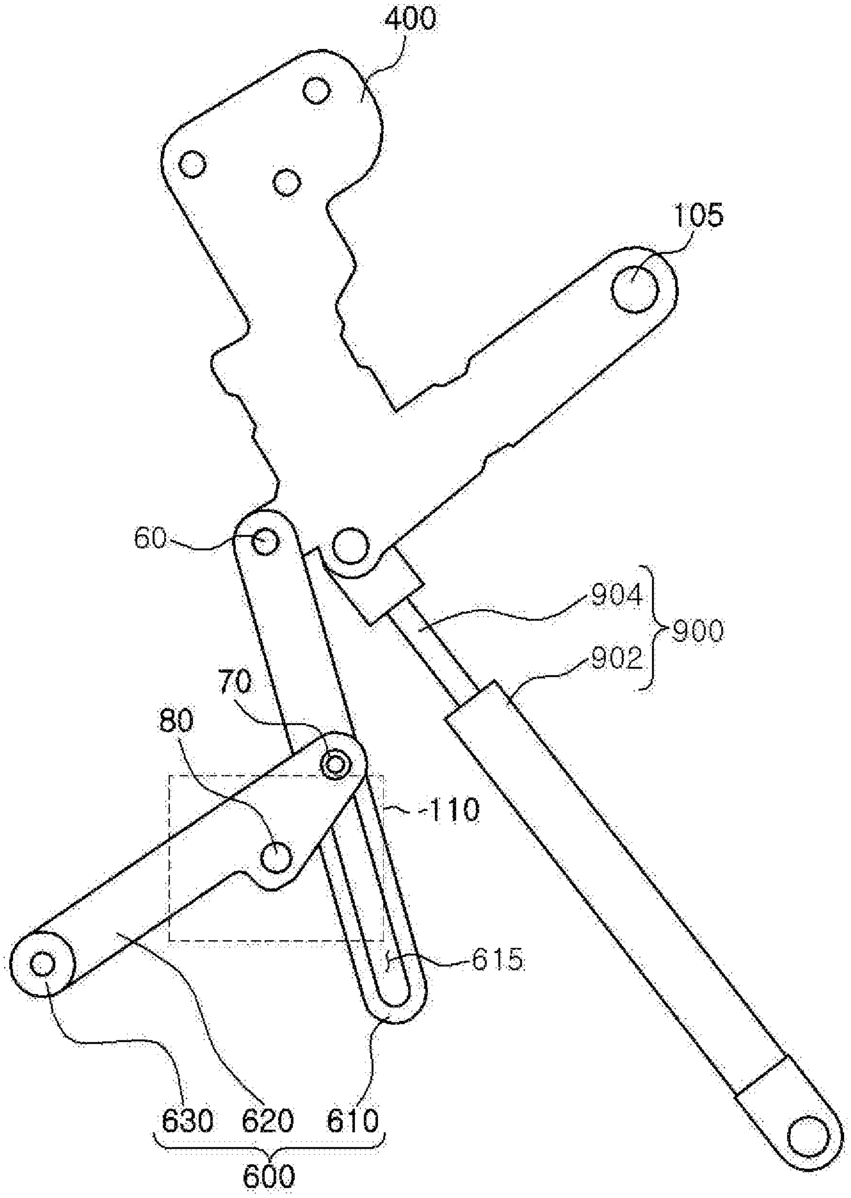
FIG. 6 shows details of the first damper and the link unit in a state where the front panel of the automated teller machine shown in FIG. 1 is opened and the display unit is moved frontward.
Figure 7:
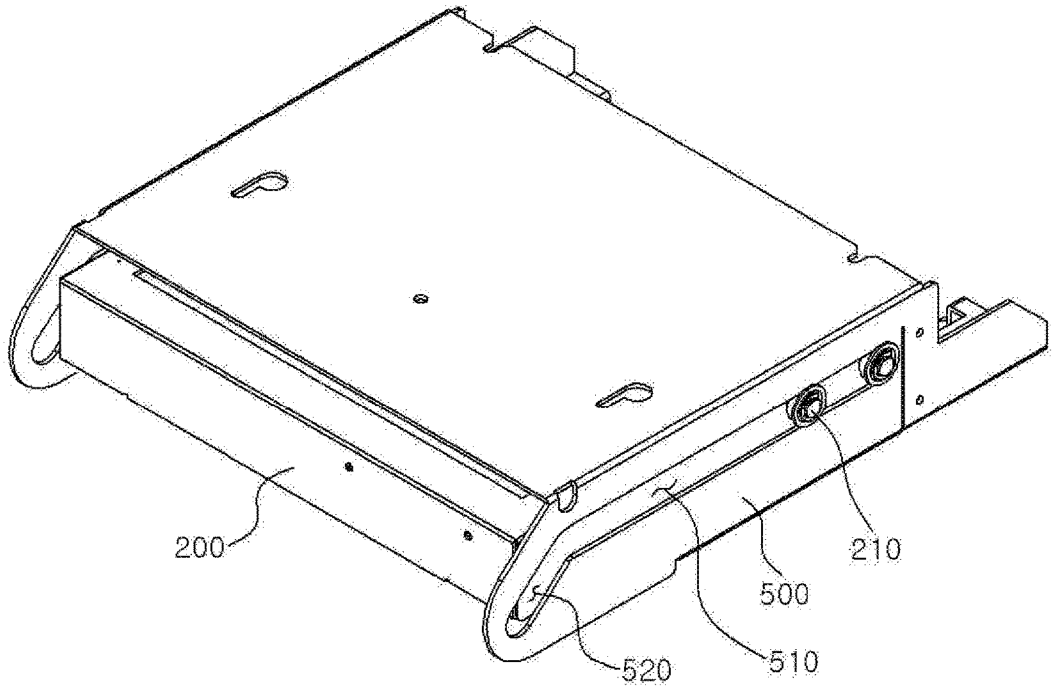
FIG. 7 shows the display unit of the automated teller machine shown in FIG. 1.
Figure 8:
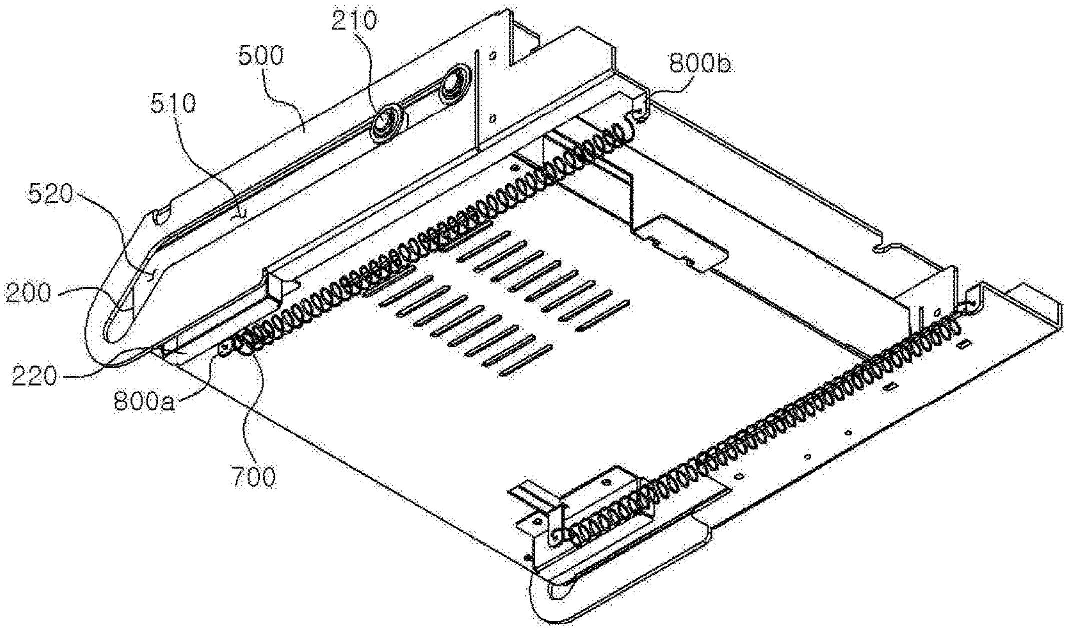
FIG. 8 is a bottom view of the display unit of the automated teller machine shown in FIG. 1.

FIG. 1 shows an automated teller machine according to an embodiment. FIG. 2 is a side view showing a state in which a front panel of the automated teller machine shown in FIG. 1 is opened. FIG. 3 is a side view showing a state in which the front panel of the automated teller machine shown in FIG. 1 is closed. FIG. 4 shows details of a first damper and a link unit in a state where the front panel of the automated teller machine shown in FIG. 1 is opened. FIG. 5 shows details of the first damper and the link unit in a state where the front panel of the automated teller machine shown in FIG. 1 is closed. FIG. 6 shows details of the first damper and the link unit in the case where the display unit is moved frontward in a state where the front panel of the automated teller machine shown in FIG. 1 is opened. FIG. 7 shows the display unit of the automated teller machine shown in FIG. 1. FIG. 8 is a bottom view of the display unit of the automated teller machine shown in FIG. 1.

Hereinafter, an "A" direction and a "B" direction in FIG. 1 will be designated as "frontward" and "backward", respectively. Further, upward rotation of the front panel 300 will be described as opening of the front panel 300 and downward rotation of the front panel 300 will be described as closing of the front panel 300.

Referring to FIGS. 1 to 8, an automated teller machine 10 according to an embodiment includes: a main frame 100; a display unit 200 provided in the main frame 100; a front panel 300 rotatably installed at the main frame 100; a mounting unit 400 that connects the front panel 300 rotatably to the main frame 100; a guide unit 500 that guides frontward/backward movement of the display unit 200; and a link unit 600, rotatably connected to the mounting unit 400, for returning the display unit 200 that has been moved frontward to an original position when the front panel 300 starts to be closed.

The main frame 100 forms the exterior of the automated teller machine 10 and may have therein various modules (not shown) for financial transactions of customers. A fixing bracket 110 for mounting the link unit 600 may be provided at a sidewall of the main frame 100.

The display unit 200 may be provided inside the main frame 100. During a maintenance operation of the automated teller machine 10, a bank staff may manipulate the display unit 200 to display information required for the maintenance.

The display unit 200 may include a guide protrusion 210 projecting from one side or both sides thereof and a retracting support member 220 provided on a bottom surface thereof.

One or more guide protrusions 210 may be provided at one side or both sides of the display unit 200. In the present embodiment, there is illustrated an example in which two guide protrusions 210 are provided at each side of the display unit 200. However, the spirit of the present disclosure is not limited thereto. The guide protrusions 210 are inserted into the guide unit 500, so that the movement of the guide protrusions 210 may be guided by the guide unit 500 when the display unit 200 is moved frontward and backward. Accordingly, the frontward/backward movement of the display unit 200 may be guided by the guide unit 500.

The retracting support member 220 formed in, e.g., a rectangular parallelepiped shape, may project from the bottom surface of the display unit 200. When the display unit 200 is moved frontward from the guide unit 500 and reaches its frontmost position, the display unit 200 may be positioned on a rotation path of a retracting member 630 of the link unit 600. As a consequence, if the retracting member 630 of the link unit 600 rotates in a state where the display unit 200 is moved to the frontmost position, the retracting member 630 and the retracting support member 220 are brought into contact with each other and the display unit 200 may be moved backward toward the guide unit 500 by a rotation force.

The front panel 300 may be installed at a front side of the main frame 100 and may rotate about a rotation axis 105. Further, various electronic devices such as a customer display device, an input device, a card reader and the like may be installed on the front panel 300.

The mounting unit 400 may be provided between the main frame 100 and the front panel 300. The mounting member 400 for allowing the front panel 300 to be rotatably connected to the main frame 100 may be, e.g., a connecting bracket.

The guide unit 500 for guiding the frontward/backward movement of the display unit 200 may be installed at a certain position in the main frame 100. The guide unit 500 and the display unit 200 may be connected via an elastic member 700. At this time, one end of the elastic member 700 may be connected to a first fixing pin 800*a* provided at one side of the display unit 200 and the other end of the elastic member 700 may be connected to a second fixing pin 800*b* provided at one side of the guide unit 500. Accordingly, the display unit 200 is pulled backward by an elastic force from the elastic member 700.

Further, the guide unit 500 may include a horizontal slit 510 for guiding horizontal movement of the display unit 200 and a downwardly inclined slit 520 extending from the horizontal slit 510. The horizontal movement indicates movement in a horizontal direction with respect to the ground.

Specifically, the guide protrusions 210 of the display unit 200 are inserted into the horizontal slit 510 and the inclined slit 520 of the guide unit 500 and moved while being guided along the horizontal slit 510 and the inclined slit 520. Accordingly, the display unit 200 can be moved frontward and backward while being guided by the guide unit 500. When a bank staff pulls the display unit 200 frontward, the display unit 200 moves along the horizontal slit 510 of the guide unit 500. When the guide protrusions 210 reach the inclined slit 520, the display unit 200 moves in a downwardly inclined direction.

When the display unit 200 is moved frontward along the guide unit 500, the elastic member 700 that connects the display unit 200 and the guide unit 500 is extended. Therefore, the display unit 200 is pulled backward by the elastic force. When the guide protrusions 210 of the display unit 200 are positioned inside the horizontal slit 510 of the guide unit 500, if an external force pulling the display unit 200 is removed, the display unit 200 returns to the original position by the elastic force of the elastic member 700. When the guide protrusions 210 are positioned inside the inclined slit 520, even if the external force is removed, the guide protrusions 210 are locked in the inclined slit 520 and the display unit 200 does not return to the original position. In a state where the guide protrusions 210 are locked in the inclined slit 520, the elastic force of the elastic member 700 acts on the display unit 200. Since, however, the position of the display unit 200 can be fixed, the bank staff can perform the operation by using the display unit 200.

The link unit 600 may be rotatably connected to the mounting unit 400 and provided at an upper sidewall of the main frame 100. Further, the link unit 600 can return the display unit 200 that has been moved frontward to the original position when the front panel 300 starts to be closed.

To do so, the link unit 600 may include a first link member 610 having one end connected to the mounting unit 400 via a first hinge 60, a second link member 620 having one end including a pin member 70 inserted into a long hole 615 formed at the first link member 610, and the retracting member 630 coupled to the other end of the second link member 620.

One end of the first link member 610 may be rotatably connected to the mounting unit 400 via the first hinge 60 connected to the mounting unit 400. The long hole 615 may be formed from the other end to the substantial centrally portion of the first link member 610.

The second link member 620 may be rotatably connected to the fixing bracket 110 via a second hinge 80. Further, the second link member 620 may be inserted into the long hole 615 so as to rotate about the pin member 70. Both ends of the second link member 620 may be formed in a flange shape to prevent the second link member 620 from being separated from the long hole 615.

In this case, one end of the second link member 620 may be connected to the first link member 610 via the pin member 70. The pin member 70 may be positioned inside the long hole 615 of the first link member 610.

Accordingly, when the mounting unit 400 rotates about the rotation axis 105 by opening the front panel 300, the first hinge 60 is raised by the rotation of the mounting unit 400 and the first link member 610 connected to the first hinge 60 is raised. At this time, the first link member 610 can be raised until the pin member 70 is brought into contact with a lower end portion of the long hole 615.

The retracting member 630 may be coupled to the other end of the second link member 620. If a bank staff moves the display unit 200 frontward from the guide unit 500 in a state where the front panel 300 is completely opened and the pin member 70 is brought into contact with the end portion of the long hole 615, the retracting support member 220 of the display unit 20 and the retracting member 630 are brought into contact with each other. Accordingly, the second link member 620 can rotate about the second hinge 80. At this time, the pin member 70 can be further raised along the long hole 615 by the rotation of the second link member 620.

On the other hand, when the front panel 300 is closed, the first hinge 60 is lowered by the rotation of the mounting unit 400. Accordingly, the first link member 610 connected to the first hinge 60 may also be lowered. If the front panel 300 is completely closed, the pin member 70 may be brought into contact with an upper end portion of the long hole 615.

When the front panel 300 starts to be closed, the first link member 610 is lowered and the pin member 70 is also lowered while being in contact with the upper end portion of the long hole 615. Therefore, the second link member 620 rotates in a clockwise direction in FIGS. 4 to 6 and the retracting member 630 pushes the retracting support member 220. Accordingly, the display unit 200 having the guide protrusions 210 positioned inside the inclined slit 520 can be raised. At this time, if the guide protrusions 210 that have been moving backward along the inclined slit 520 of the guide unit 500 are inserted into the horizontal slit 510, the display unit 200 can return to the original position by the elastic force of the elastic member 700.

The automated teller machine 10 according to the embodiment may further include: a first damper 900, provided at an upper sidewall of the main frame 100, connected to the link unit 600, for reducing impact that may be generated when the front panel 300 is opened or closed; a second damper 1000, provided at a lower sidewall of the main frame 100, for reducing impact that may be generated when the front panel 300 is closed; and a damping member 1100 provided at an inner side surface of the front panel 300 so as to face the second damper 100.

One end of the first damper 900 may be hinge-coupled to the mounting unit 400 and the other end of the first damper 900 may be hinge-coupled to the sidewall of the main frame 100. The first damper 900 may be provided to reduce impact that may be generated when the front panel 300 is opened or closed. To do so, the first damper 900 may be, e.g., a gas spring. The first damper 900 may include a first cylinder 902 and a first piston rod 904.

Specifically, when the front panel 300 is opened, the first piston rod 904 may be extended from the first cylinder 902. The degree of extension of the first piston rod 904 from the first cylinder 902 may vary depending on an opening degree of the front panel 300. On the other hand, when the front panel 300 is closed, the first piston rod 904 may be retracted into the first cylinder 902. When the first piston rod 904 is extended from or retracted into the first cylinder 902, resistance may act on the operation of the first piston rod 904. The resistance may be generated by, e.g. a pressure of gas filling the first cylinder 902. Accordingly, the rotation axis 105 can be protected from damage caused by sudden opening of the front panel 300.

The second damper 1000 may be installed at the lower sidewall of the main frame 100 and reduce impact that may be generated when the front panel 300 is closed.

To do so, the second damper 1000 may be, e.g., a gas spring. The second damper 1000 may include a second cylinder 1002 and a second piston rod 1004. As in the case of the first damper 900, in the second damper 1000, the second piston rod 1004 may be extended from or retracted into the second cylinder 1002. The operation of the second piston rod 1004 may be disturbed by resistance, so that sudden operation can be suppressed.

On the inner side surface of the front panel 300, the damping member 1100 may project at a position corresponding to the second damper 1000. The second damper 1000 may be selectively in contact with the damping member 1100 when the front panel 300 is closed. The damping member 1100 may be made of, e.g., a rubber material, in order to further reduce impact generated by the contact with the second damper 1000. However, the material of the damping member 1100 is not limited thereto.

The damping member 1100 projects toward the main frame 100 and thus may be brought into contact with the end of the second piston rod 1004 immediately before the front panel 300 is completely closed. Then, the second piston rod 1004 is retracted into the second cylinder 1002, so that the impact applied to the front panel 300 can be reduced.

In the present embodiment, the case in which the first damper 900 and the second damper 1000 are gas springs is illustrated and described. However, it is merely an example, and the spirit of the present disclosure is not restrictively interpreted by the types of the first and the second damper 900 and 1000.

Hereinafter, the operation and the effect of the automated teller machine 10 having the above-described configuration will be described with reference to FIGS. 9 to 11.

Figure 9:
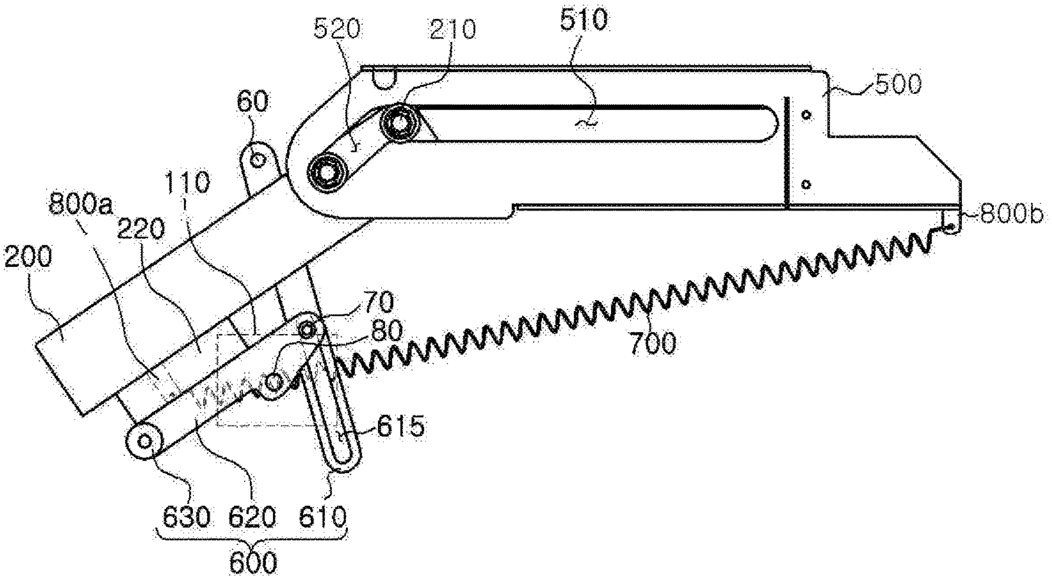
FIG. 9 shows a state in which the front panel of the automated teller machine shown in FIG. 1 is opened and the display unit is moved frontward.

FIG. 9 shows a state in which the front panel of the automated teller machine shown in FIG. 1 is opened and the display unit is moved frontward. FIG. 10 shows a state in which the front panel of the automated teller machine shown in FIG. 1 starts to be closed and the display unit is moved backward. FIG. 11 shows a state in which the display unit of the automated teller machine shown in FIG. 1 is completely moved backward.

Figure 10:
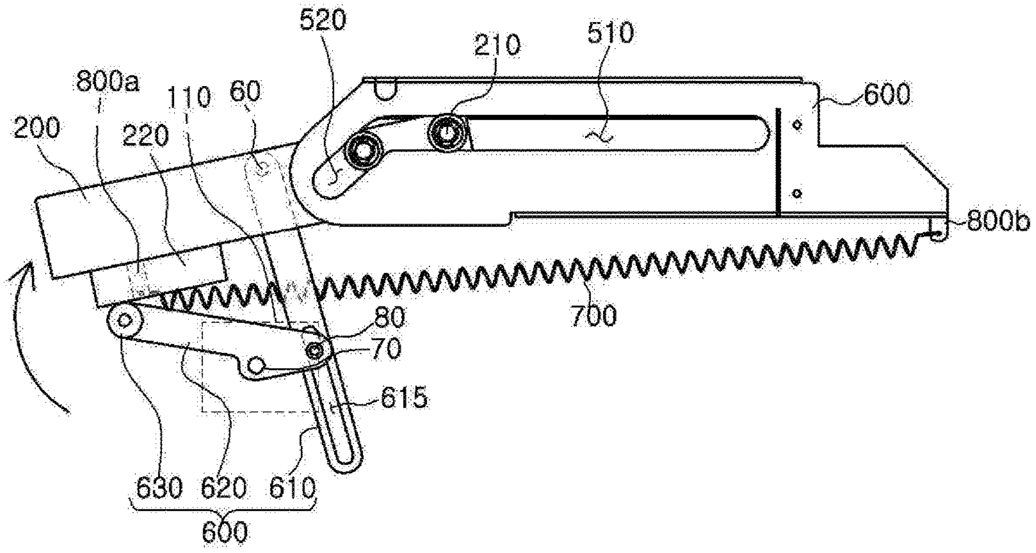
FIG. 10 shows a state in which the front panel of the automated teller machine shown in FIG. 1 starts to be closed and the display unit is moved backward.
Figure 11:
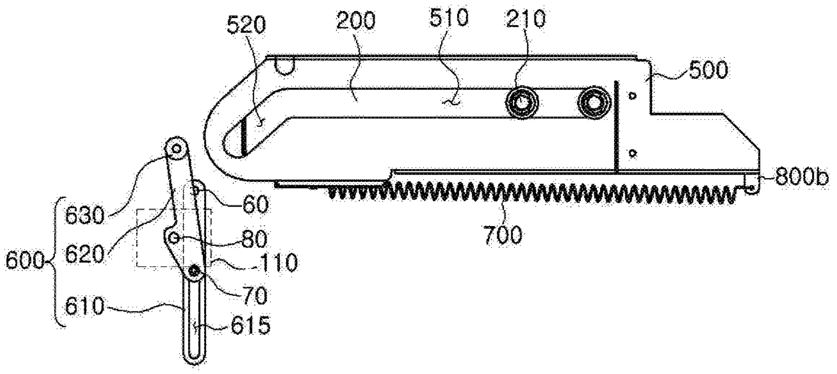
FIG. 11 shows a state in which the display unit of the automated teller machine shown in FIG. 1 is completely moved backward.

Referring to FIGS. 9 to 11, a bank staff can rotate the front panel 300 about the rotation axis 105 in order to open the front panel 300. At this time, the mounting unit 400 also rotates, so that the first hinge 60 is raised. Further, the first damper 900 is extended, and the first link member 610 is raised.

The first link member 610 may be raised until the pin member 70 becomes in contact with the lower end portion of the long hole 615. At least a part of the second link member 620 is overlapped with the first link member 610.

As described above, the bank staff opens the front panel 300 and then moves the display unit 200 frontward from the guide unit 500 by using a handle (not shown) provided at the display unit 200.

The display unit 200 moves along the horizontal slit 510 of the guide unit 500 and then moves in a downwardly inclined direction along the inclined slit 520 of the guide unit 500. Accordingly, the visibility of the information displayed on the display unit 200 is improved and the operation efficiency of the bank staff can be enhanced. Since the retracting support member 200 pushes the retracting member 630 as the display unit 200 moves frontward, the second link member 620 can rotate about the second hinge 80.

Next, the bank staff can close the front panel 300 by rotating the front panel 300 about the rotation axis 105. At this time, even if the bank staff closes the front panel 300 without recognizing the display unit 200 having the guide protrusions 210 locked in the inclined slit 520, the display unit 200 can automatically return to the original position by the elastic force of the elastic member 700 and the above-described rotation of the link unit 600 during the closing operation of the front panel 300.

Therefore, even when the bank staff does not actively return the display unit 200 to the original position before the front panel 300 is closed, it is possible to avoid in advance the damage caused by collision between the display unit 200 and the front panel 300 which may be generated during the closing operation of the front panel 300.

In addition, the impact caused by sudden vertical movement of the front panel 300 during the opening/closing operation of the front panel 300 can be reduced by the first damper 900 and the second damper 1000. Accordingly, the front panel 300 can be protected from the impact in advance.

While the embodiments of the present disclosure have been described with reference to the accompanying drawings, it will be understood by those skilled in the art that the present disclosure can be implemented in other specific forms without changing the technical spirit or essential features of the present disclosure. For example, those skilled in the art can implement the present disclosure in the form that is not clearly described in the embodiments of the present disclosure by changing materials, sizes and the like of the respective components depending on application fields or by combining or replacing the embodiments without departing from the scope of the present disclosure. Therefore, it should be noted that the above-described embodiments are merely illustrative in all aspects and are not to be construed as limiting the present disclosure and also that the modifications are included in the technical spirit of the present disclosure which is described in the following claims.

What is claimed is:

1. An automated teller machine comprising:
- a main frame;
- a display unit provided in the main frame;
- a front panel rotatably installed at the main frame;
- a mounting unit connecting the front panel rotatably to the main frame;
- a guide unit guiding front and backward movement of the display unit; and
- a link unit, rotatably connected to the mounting unit, configured to return the display unit that has been moved frontward to an original position when the front panel starts to be closed.

2. The automated teller machine of claim 1, wherein the guide unit includes:

a horizontal slit configured to guide the display unit to move in a horizontal direction; and an inclined slit, extending from the horizontal slit and inclined downward.

3. The automated teller machine of claim 2, wherein the display unit includes:

one or more guide protrusions projecting at one side or both sides the display unit, wherein said one or more guide protrusions are inserted into the horizontal slit and the inclined slit and moved along the horizontal slit and the inclined slit.

4. The automated teller machine of claim 1, further comprising:

an elastic member, having one end connected to the display unit and the other end connected to the guide unit, wherein when the display unit is moved frontward from the guide unit, an elastic force of the elastic member acts on the display unit.

5. The automated teller machine of claim 1, wherein the link unit includes:

a first link member having one end connected to the mounting unit via a first hinge;

a second link member having one end including a pin member inserted into a long hole formed at the first link member; and a retracting member coupled to the other end of the second link member.

6. The automated teller machine of claim 5, wherein the display unit has a retracting support member that becomes in contact with the retracting member when the front panel is closed, and wherein when the retracting member rotates in a state where the display unit is moved frontward from the guide unit and reaches a frontmost position, the retracting member and the retracting support member are brought into contact with each other and the display unit is moved backward toward the guide unit by a rotation force.

7. The automated teller machine of claim 1, further comprising:

a first damper, provided at an upper sidewall of the main frame, rotatably connected to the mounting unit, configured to reduce impact that may be generated when the front panel is opened or closed; and a second damper, provided at a lower sidewall of the main frame, configured to reduce impact that may be generated when the front panel is closed.

* * * * *